United States Patent [19]

Finke et al.

[11] Patent Number: 4,824,932

[45] Date of Patent: Apr. 25, 1989

[54] METHOD OF MANUFACTURING THERMOPLASTICALLY PROCESSIBLE AROMATIC POLYAMIDES AND POLYAMIDIMIDES FROM BISAMIDE

[75] Inventors: Juergen Finke, Marl; Martin Bartmann, Recklinghausen, Fed. Rep. of Germany

[73] Assignee: Hüls Aktiengesellschaft, Marl, Fed. Rep. of Germany

[21] Appl. No.: 947,897

[22] Filed: Dec. 30, 1986

[30] Foreign Application Priority Data

Apr. 17, 1986 [DE] Fed. Rep. of Germany ....... 3612935

[51] Int. Cl.$^4$ .............................................. C08G 69/28
[52] U.S. Cl. .................................... 528/363; 528/171; 528/173; 528/176; 528/185; 528/337; 528/352; 528/362
[58] Field of Search ............... 528/363, 173, 171, 176, 528/271, 367, 185, 337, 352

[56] References Cited

U.S. PATENT DOCUMENTS

| | | | |
|---|---|---|---|
| 3,503,931 | 3/1970 | Radlmann et al. | 528/173 |
| 3,505,288 | 4/1970 | Bodesheim et al. | 528/173 |
| 3,753,948 | 8/1973 | Brode et al. | 528/173 |
| 4,003,879 | 1/1977 | Lennox et al. | 528/185 |
| 4,018,747 | 4/1977 | Malz et al. | 528/363 |
| 4,317,902 | 3/1982 | Hinderer | 528/173 |
| 4,410,684 | 10/1983 | Nelb et al. | 528/185 |
| 4,621,134 | 11/1986 | Aritomi et al. | 528/337 |
| 4,727,130 | 2/1988 | Bartmann | 528/173 |
| 4,749,768 | 6/1988 | Finke et al. | 528/173 |

*Primary Examiner*—Harold D. Anderson
*Attorney, Agent, or Firm*—Oblon, Fisher, Spivak, McClelland & Maier

[57] ABSTRACT

The invention relates to aromatic polyamides and polyamidimides, and a method of manufacturing these by transamidation of aromatic biasmides of carboxylic acids, using aromatic di- and/or tricarboxylic acids or their anhydrides, in the melt, at temperatures between 220° to 390° C.

10 Claims, No Drawings

METHOD OF MANUFACTURING THERMOPLASTICALLY PROCESSIBLE AROMATIC POLYAMIDES AND POLYAMIDIMIDES FROM BISAMIDE

BACKGROUND OF THE INVENTION

1. Field of the Invention

The invention relates to the production of aromatic polyamides and polyamidimides which are thermoplastically processible and have high temperature stability and good mechanical properties.

2. Discussion of the Background

Aromatic polyamides with the recurring unit:

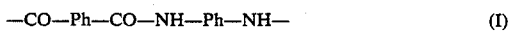

—CO—Ph—CO—NH—Ph—NH—      (I)

and aromatic polyamidimides with the recurring unit:

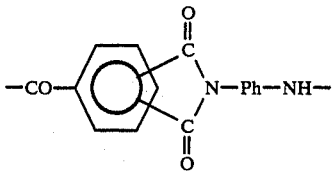

not only have outstandingly high temperature stability and good mechanical properties, but they are also thermoplastically processible. See Elias and Vohwinkel, "Neue polymere Werkstoffe fuer die industrielle Anwendung", 2nd Series, Carl Hanser Verlag, pp. 242 ff. (1983).

Known methods of producing aromatic polyamides include the following.

1. Low temperature "solution polycondensation" by reacting aromatic dicarboxylic acid dichlorides with aromatic diamines in polar solvents (U.S. Pat. Nos. 3,287,324; 3,541,056; 3,600,350; 3,819,587; 3,767,756; 3,869,429; 3,673,143; 3,817,941 and 3,063,966; and German AS No. 22 19 703).
2. Interfacial polycondensation by reaction between an aromatic dicarboxylic acid dichloride and an aromatic diamine, at the interface between an organic and an aqueous phase (German OS Nos. 19 08 297 and 23 25 139; and German Pat. No. 3,006,899).

Aromatic polyamides can also be produced by reaction of aromatic dicarboxylic acids with aromatic diisocyanates (German OS No. 19 28 435) or by reaction of aromatic dicarboxylic acid diaryl esters with aromatic diamines.

Thus, Brode et al describes the preparation of 4,4'-[sulfonylbis(p-phenyleneoxy)-] dianiline from p-aminophenol and 4,4'-dichlorodiphenylsulfone, and condensation of this product with aromatic acyl chlorides (e.g., terephthalic acid chloride) to aromatic polyamides with glass transition temperatures (Tg) between 230° and 320° C. See *Polym. Prep. Am. Chem. Soc. Div. Pol. Chem.*, 15:761 (1974); and *Adv. Chem. Ser.*, 142 (1975). See also *Chem. Abstr.* 84, 5530s, and 83, 193186f.

These methods have the disadvantage that they depend on the use of activated monomers which are difficult to handle.

Methods are also known wherein aromatic polyamides are obtained directly by reaction of aromatic dicarboxylic acids and aromatic diamines in the presence of aromatic phosphites. Solvents which have proven useful for this method are N-methyl acid amides, particularly N-methylpyrrolidone. If other dipolar aprotic solvents, such as dimethylsulfoxide, are used, no polymeric amides are obtained. See Higashi, F., et al., *J. PolYm. Sci., Polym. Chem. Ed.*, 18:1711 ff (1980).

A method is also known wherein aromatic polyamides are produced by polycondensation in the melt, of certain dicarboxylic acids with certain diamines, in the presence of phosphorous-containing compounds (See German Patent Application P No. 36 09 011.5).

In addition to the methods mentioned above in which the condensation is carried out in a solvent, there have also been additional attempts to produce polyamides and polyamidimides in the melt. Thus, U.S. Pat. No. 3,109,836 describes a method of producing polyamides with the recurring unit (CO—Ar—NH), in which acetamidobenzoic acid is heated to 200°–300° C. for 3 hr., in a vacuum. This method does not result in thermoplastically processible products (in contrast to the methods according to the present invention), because the melting points of the reaction products are in the range of the decomposition temperatures or above.

A similar method is described in German OS No. 21 18 388. The reaction occurs in the solid phase. Therefore, the reaction rate is very low. It is not possible to thermoplastically process the product, for example in an extruder.

It has also been proposed to produce aromatic polyamides by transamidation of acylated aromatic amines, in the melt. In order to improve processibility of the product, mixtures of the starting products with aliphatic substances are used, instead of the pure aromatic starting compounds. The diamines are not completely acylated; only partially. Acetic acid, acetic anhydride, dimethylacetamide, or some other agent for improving flowability, is added to the reaction melt. See Keske et al., *Polym. Prep.*, 25, Part XXV, 25 (1984); and U.S. Pat. No. 3,654,227.

U.S. Pat. Nos. 4,358,561; 4,348,513 and 4,447,574 describe production of polyamidimides by reacting acylated aromatic diamines with aromatic tricarboxylic acid anhydrides and dicarboxylic acids. If only partially acylated diamines are used as described, water-containing acetic acid is liberated during the polycondensation. The corrosive action of this acid necessitates costly special apparatus. The products have very high softening temperatures, which are in the range of the decomposition temperatures. The products are therefore unsuited for being thermoplastically processed.

The preparation of a polyimide molding powder is described in German OS 21 18 388. The dianhydride of an aromatic tetracarboxylic acid is reacted with a bisamide, or else self-condensation of an aromatic compound which has both an acetamido group and an anhydride group is carried out. Also, U.S. Pat. No. 3,654,227 describes reaction of aromatic bisamides with aromatic tetracarboxylic acid dianhydrides, to form oligomeric polyimides. In both cases, one does not obtain any high molecular weight polyamides which are thermoplastically processible.

SUMMARY OF THE INVENTION

Accordingly, one object of the present invention is to provide a method for producing polyamides and polyamidimides which are thermoplastically processible and have high molecular weights.

Another object of the invention is to provide a method for producing polyamides and polyamidimides which does not result in the decomposition of these compounds at high temperatures.

A further object of the invention is to provide polyamides and polyamidimides which are thermoplastically processable and display birefringence in the melt.

These objects and other objects of the invention which will become apparent from the following specification have been achieved by the novel method of manufacturing thermoplastically processible aromatic polyamides and polyamidimides of the present invention comprising, transamidation of aromatic bisamides of the formula

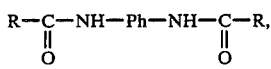

wherein R is an alkyl group with 1-4 C atoms, and Ph is the difunctional p-phenylene group:
wherein said transamidation comprises reacting
(A) at least one aromatic polycarboxylic acid selected from the group consisting of
  (i) isophthalic acid which may be substituted for by terephthalic acid in amounts up to 60 mol %;
  (ii) an acid having the formula

wherein x is
—CH$_2$—, —CO—, —O—, —S—, —SO$_2$, or
—O—Ph—SO$_2$—Ph—O—;
and A is

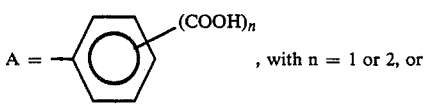, with n = 1 or 2, or

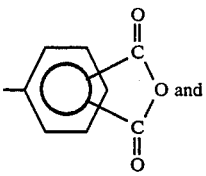

(iii) a naphthalenecarboxylic acid of formula

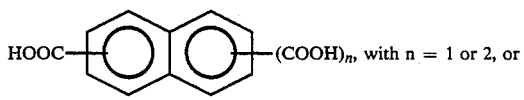, with n = 1 or 2, or

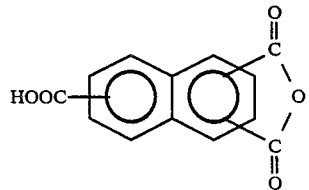

(b) with at least one aromatic bisamide of the formula

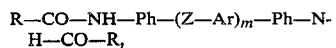

wherein R is an alkyl group with 1-4 C atoms;
wherewith the said bisamide may be replaced to the extent of up to 50 mol % by a bisamide of formula R—CO—NH—Ph—(Z—Ar)$_m$—Ph—NH—CO—R, where m=0 or 1, R is an alkyl group with 1-4 C atoms, and Z is —O—, —S—, —SO$_2$—, —CO—, or —CH$_2$— and the polyamides and polyamidimides so produced.

DETAILED DESCRIPTION OF THE PREFERRED EMBODIMENTS

A method has now been discovered whereby certain aromatic bisamides can be reacted with certain aromatic polycarboxylic acids or anhydrides of the same, in the melt, to give aromatic polyamides and/or aromatic polyamidimides. Surprisingly, the products obtained are not only thermoplastically processable, but in addition they display birefringence in the melt. Characterization of liquid crystal phases by birefringence is described in U.S. Pat. No. 4,118,372. Accordingly, a new class of technically interesting and important aromatic polyamides has been made available by the invention.

The present method of producing polyamides or polyamidimides consists of reacting an approximately equimolar mixture of the aromatic polycarboxylic acid and/or its anhydride with the aromatic bisamides, in the melt, possibly in the presence of a catalyst, at temperatures between about 200° to 380° C.

The addition of the small amount of catalyst has the following major effects on the form of the reaction products:
  (i) the viscosity number J, which is a measure of the molecular weight, is greatly increased;
  (ii) the color quality of the polymers is greatly improved;
  (iii) the polycondensation time is greatly reduced; and
  (iv) the molecular weight of the resulting polyamides is between 10,000 and 200,000, preferably between 20,000 and 70,000.

The following aromatic polycarboxylic acids or their anhydrides can be used according to the invention:
Isophthalic acid, which may permissibly be replaced by terephthalic acid to the extent of up to 60 mol %;
Trimellitic acid;
The monoanhydride of trimellitic acid produced readily by heating the acid;
An acid having the following formula, containing at least 2 aromatic rings

wherein X represents any of the following difunctional groups:
—CH$_2$—, —CO—, —O—, —S—, —SO$_2$, and —O—Ph—SO$_2$—Ph—O—; where A represents either of the following aromatic moieties:

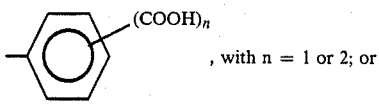

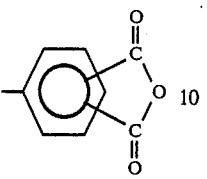

and Ph represents the difunctional p-phylene group.

Preferably, the aromatic polycarboxylic acid is an aromatic dicarboxylic acid of formula:

HOOC—Ph—X—Ph—COOH where X may be, in particular,

—O—Ph—SO$_2$—Ph—O—.

See Lorenz et al., *Makromolekulare Chemie.*, 130: 65 (1969).

Aromatic bisamides of the following formula or mixtures of such bisamides may be employed, according to the invention:

R—CO—NH—Ph—X—Ph—Y—Ph—X—Ph—NH—CO—R, wherein R represents an alkyl group with 1-4 C atoms, particularly methyl.

Specific examples are 4,4'-bis(4-acetylaminophenoxy)diphenylsulfone (X=O, Y=SO$_2$) and 4,4'-bis(4-acetylaminophenylsulfonyl)diphenyl ether (X=SO$_2$, Y=O).

The compound with X=O and Y=SO$_2$ is obtained by reacting p-aminophenol with 4,4'-dichlorodiphenyl sulfone, followed by acylation.

The compound with X=SO$_2$ and Y=O is produced using the method of U.S. Pat. No. 3,859,252, followed by acylation.

Up to 50 mol % of the bisamides described above can be replaced by aromatic bisamides having the following general formula:

R—CO—NH—Ph (Z—Ph)$_m$—Ph—CO—R, where
m=0 or 1,
R is an alkyl group with 1-4 C atoms, and
Z is any of —O—, —S—, —SO$_2$—, —CO—, or —CH$_2$—.

The amount of aromatic dicarboxylic acid employed per mole of aromatic diamine is 0.95-1.05 mol, preferably 1.0 mole.

The reaction of the aromatic dicarboxylic acids and/or anhydrides with the bisamides may be carried out in the presence of a catalyst in the amount of 0.1-5 wt. %, based on the amount of the polycarboxylic acid (or anhydride) and bisamide employed.

Suitable catalysts include inorganic basic salts, particulary alkali carbonates and alkaline earth carbonates, e.g., calcium carbonate; and alkali or alkaline earth acetates, e.g., zinc acetate or sodium acetate.

Ordinarily, the method is carried out under inert gas, at normal pressure. However, if for any reason such may be desired, a slight over-pressure or vacuum may be employed. The reaction time needed to obtain products of sufficiently high molecular weight is between 1 and 4 hr.

The polycondensation can be carried out in the melt, at temperatures between about 200° and 390° C., preferably 250°-380° C. In particular, there are 3 embodiments of the method:

I. The reactants and catalysts are melted together, and pre-condensation is carried out at temperatures between 200° and 380° C. Then the temperature is raised to 350°-390° C., and the prepolymer is further condensed. The development of high molecular weights is determined by a sharp increase in the viscosity of the melt.

II. A mixture of the reactants and catalysts, in powder form, is processed in a kneader, with a gradual increase in temperature from 220° to 350° C., until the water produced in the condensation is removed. Alternatively, it is possible to carry out the polycondensation in an extruder, again with the apparatus being charged with a mixture of the components in powder form. In the use of an extruder, the temperature is adjusted to achieve complete removal of the water of reaction.

III. It is also possible to use Embodiment I to produce the precondensate from the starting material, at a temperature of 200°-280° C., and then to further condense the pre-condensate in a kneader or an extruder. The temperature required in an extruder is typically 280°-370° C., preferably 290°-350° C. This embodiment is particularly preferred.

If the molecular weight of the final product is insufficient, it is possible to increase it by further condensation in the solid phase. This technique is familiar to those skilled in the art. As a general rule, higher temperatures are required for polyamidimides than for polyamides.

In order to produce products of sufficient molecular weight, it is necessary to remove the acid formed during the polycondensation from the system. With Embodiment I, it is sufficient to pass an inert gas through or over the system. Also, a vacuum may be applied.

At the end of the polycondensation, one obtains a more or less viscous polymer melt which can be further processed directly, to produce a granulate.

The products can be fabricated into sheet or film by pressure-forming at elevated temperature (>200° C.). Alternatively, pour-formed sheet or film can be produced in the usual fashion from organic solutions of the polyamides in suitble aprotic polar solvents.

The invention now being generally described, the same will be better understood by reference to certain specific examples which are included herein for purpose of illustration only and are not intended to be limiting of the invention or any embodiment thereof, unless specified.

EXAMPLES

In the following examples, the viscosity number 3 of the polyamide products, which serve as comparative measures of molecular weight, were all determined in 1:1 (by volume) mixtures of 1,2-dichlorobenzene and phenol.

EXAMPLE 1

23.83 g (0.05 mol) 4,4'-bis(4-acetylaminophenoxy)-diphenylsulfone and 9.61 g (0.05 mol) trimellitic acid anhydride were melted under nitrogen in a tubular polycondensation reactor at 250° C., and were stirred 40 min. at 290° C. Over the course of 10 min., the temperature was increased to 350° C. After 25 min. at 350° C. under the vacuum of a water jet pump, the product mixture was allowed to cool. The product was a golden brown solid, with viscosity number J =90 cc/g.

EXAMPLE 2

25.83 g (0.05 mol) 4,4'-bis(4-acetylaminophenoxy)-diphenylsulfone, 9.61 g (0.05 mol) trimellitic acid anhydride, and 0.30 g $CaCO_3$ were melted at 250° C., followed by stirring 15 min. at 280° C. The temperature was increased to 300° C. over a period of 10 min., and to 320°, 340° and finally 360° C. over 10 min. After 2 min. at 350° C., the product mixture was allowed to cool. J =45 cc/g.

EXAMPLE 3

25.83 g (0.05 mol) 4,4'-bis(4-acetylaminophenoxy)-diphenylsulfone, 8.31 g (0.05 mol) isophthalic acid, and 0.30 g $CaCO_3$ were stirred 30 min. at 250° C., following which the temperature was increased to 350° C. over a period of 20 min. After 20 min. at 350° C. under an aspirator vacuum, the product mixture was allowed to cool. J =40 cc/g.

Obviously, numerous modifications and variations of the present invention are possible in light of the above teachings. It is therefore to be understood that within the scope of the appended claims, the invention may be practiced otherwise than as specifically described herein.

What is claimed as new and desired to be Secured By Letters Patent Of The United States Is:

1. A method for manufacturing a thermoplastically processible aromatic polyamide or polyamidimide, comprising subjecting to a transamidation reaction a component (A) and a component (B);
wherein said component (A) is at least one aromatic polycarboxylic acid selected from the group consisting of
 (i) isophthalic acid, a combination of up to 60 mol % of terephthalic acid and at least 40 mol % of isophthalic acid;
 (ii) an acid having the formula

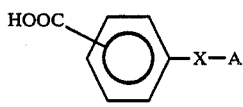

wherein:
X is —$CH_2$—, —CO—, —O—, —S—, —$SO_2$—, or —O—Ph—$SO_2$—Ph—O—; and
A is

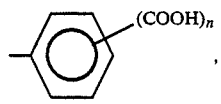

with n is 1 or 2,

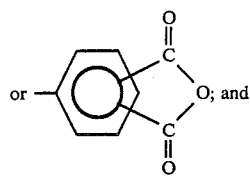

(iii) a naphthalenecarboxylic acid of formula

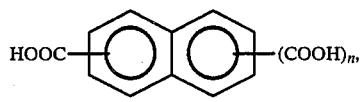

with n is 1 or 2,

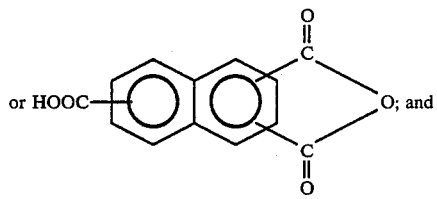

component (B) is at least one aromatic bisamide of the formula (I)

R—CO—NH—Ph—X—Ph—Y—Ph—X—Ph—NH—CO—R, or a mixture of at least 50 mol % by a bisamide of formula (I) and up to 50 mol % of a bisamide of the formula R—CO—NH—Ph—(Z—Ar)$_m$—Ph—NH—CO—R, wherein:
Ph is a difunctional phenylene radical;
R is an alkyl group having 1 to 4 carbon atoms;
Ar is an aromatic radical;
Y is $SO_2$ or O;
Z is —O—, —S—, —$SO_2$—, —CO—, or —$CH_2$—; and
m is 0 or 1.

2. The method of claim 1, wherein said polycarboxylic acid is isophthalic acid or trimellitic acid anhydride.

3. The method of claim 1, wherein said bisamide is 4,4'-bis(4-acetylaminophenoxy)diphenylsulfone.

4. The method of claim 1, wherein said bisamide is 4,4'-bis(4-acetylaminophenylsulphonyl)diphenyl ether.

5. The method of claim 1, wherein said transamidation is carried out in the presence of 0.1–5 wt. % of a basic catalyst, based on the weight of said aromatic polycarboxylic acid and said bisamide.

6. The method of claim 5, wherein said catalyst is an inorganic basic salt.

7. The method of claim 5, wherein said catalyst is an alkali or alkaline earth carbonate or an alkali or alkaline earth acetate.

8. The method of claim 1, wherein said transamidation is conducted at temperatures between about 200° and 390° C.

9. The method of claim 8, wherein said transamidation is conducted between 250°–380° C., inclusive.

10. The method of claim 1, wherein said transamidation reaction is conducted in a kneader or an extruder.

* * * * *